US006330874B2

(12) United States Patent
Cianciara et al.

(10) Patent No.: US 6,330,874 B2
(45) Date of Patent: Dec. 18, 2001

(54) METHOD FOR THE CYLINDER-SELECTIVE KNOCK CONTROL OF AN INTERNAL COMBUSTION ENGINE

(75) Inventors: Wojciech Cianciara, Grünthal; Gerhard Fischer, Maxhütte-Deglhof; Thomas Haug, Straubing, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/750,209

(22) Filed: Dec. 22, 2000

Related U.S. Application Data

(63) Continuation of application No. PCT/DE99/01787, filed on Jun. 17, 1999.

(30) Foreign Application Priority Data

Jun. 22, 1998 (DE) .............................. 198 27 704

(51) Int. Cl.$^7$ .................................................. F02P 5/152
(52) U.S. Cl. .................................. 123/406.2; 123/406.38
(58) Field of Search .......................... 123/406.2, 406.11, 123/406.34, 406.36, 406.37, 406.38, 406.39; 701/102, 110, 111

(56) References Cited

U.S. PATENT DOCUMENTS

| 4,527,525 | * | 7/1985 | Mauermann et al. | 123/406.37 |
| 4,819,599 | * | 4/1989 | Chemnitzer | 123/406.36 |
| 4,819,603 | | 4/1989 | Morita et al. | 123/406.21 |
| 4,882,695 | | 11/1989 | Mieno et al. | 701/111 |
| 4,981,124 | * | 1/1991 | Sellner et al. | 123/406.16 |
| 5,014,670 | * | 5/1991 | Mitsumoto | 123/406.15 |
| 5,243,942 | * | 9/1993 | Entenmann et al. | 123/406.33 |
| 5,421,304 | * | 6/1995 | Gibtner et al. | 123/406.39 |
| 2001/0002590 | * | 6/2001 | Cianciara et al. | 123/406.2 |

FOREIGN PATENT DOCUMENTS

| 29 25 770 | 1/1980 | (DE) . |
| 36 35 963 A1 | 5/1987 | (DE) . |
| 42 05 889 C2 | 10/1995 | (DE) . |
| 42 05 888 C2 | 12/1995 | (DE) . |
| 195 32 504 A1 | 3/1997 | (DE) . |
| 195 39 171 A1 | 4/1997 | (DE) . |
| 196 05 407 A1 | 8/1997 | (DE) . |

OTHER PUBLICATIONS

Japanese Patent Abstract No. 05141334 (Koichi), dated Jun. 8, 1993.

* cited by examiner

Primary Examiner—Henry C. Yuen
Assistant Examiner—Hieu T. Vo
(74) Attorney, Agent, or Firm—Herbert L. Lerner; Laurence A. Greenberg; Werner H. Stemer

(57) ABSTRACT

The total ignition angle $ZW(z)$ of each cylinder z is composed of cylinder-selective values basic ignition angle $GZ(z)$ {determined by engine speed n and load L}, knock adjustment angle $KNK(z)$, in addition to a first adaptation value $AD1(z)$ and a second adaptation value $AD2$ common to all cylinders. $AD1(z)$ is increased when $KNK(z)$ is greater than a threshold DEC and is reduced when $KNK(z)$ is lower than a threshold INC. The second adaptation value $\overline{AD2}$ is formed as a function of the average value $\overline{AD1}$ of the adaptation values of all cylinders.

6 Claims, 1 Drawing Sheet

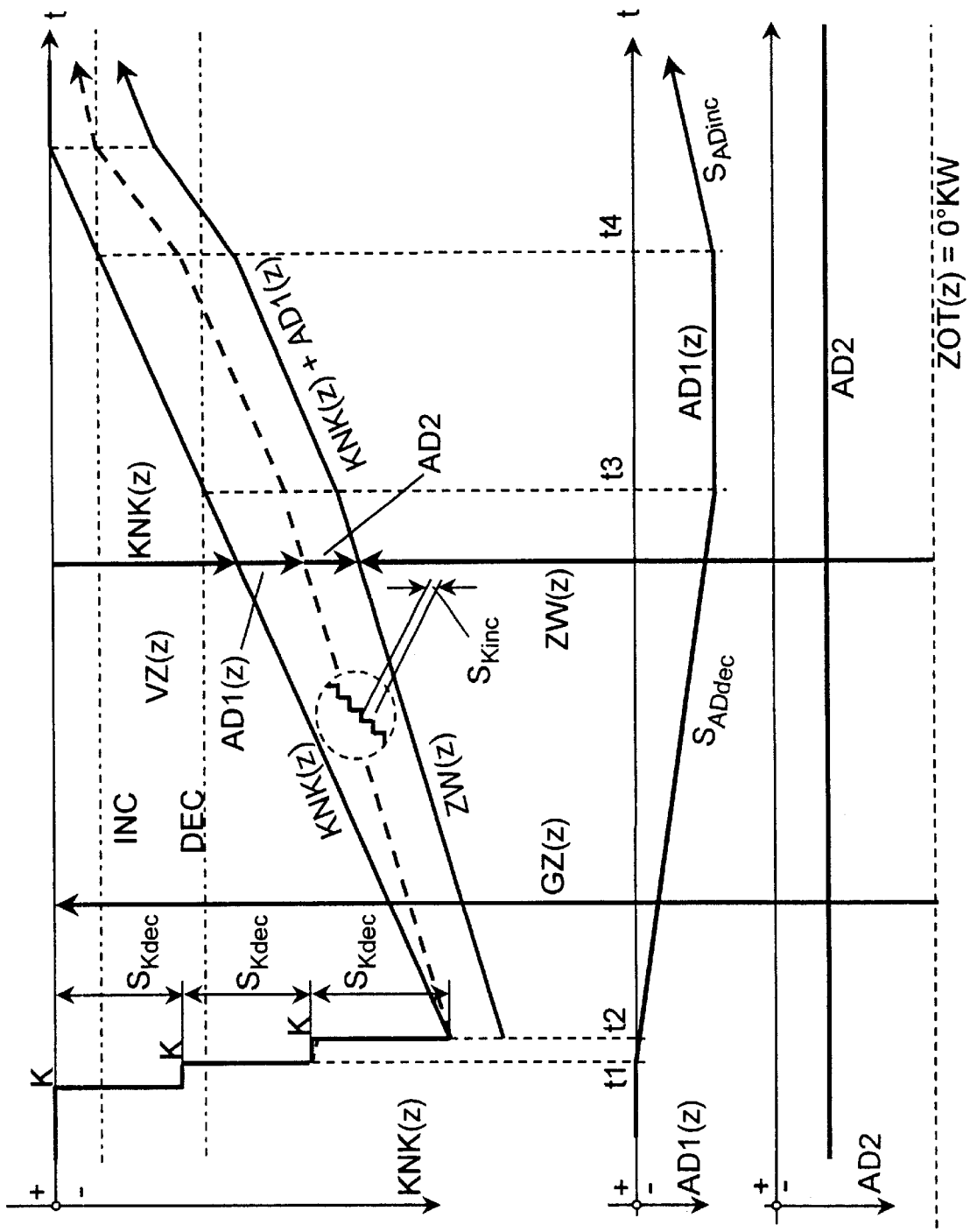

METHOD FOR THE CYLINDER-SELECTIVE KNOCK CONTROL OF AN INTERNAL COMBUSTION ENGINE

CROSS-REFERENCE TO RELATED APPLICATION

This is a continuation of copending International Application PCT/DE99/01787, filed Jun. 17, 1999, which designated the United States.

BACKGROUND OF THE INVENTION

FIELD OF THE INVENTION

The invention relates to a method for the cylinder-selective knock control of an internal combustion engine, in which a predetermined cylinder-selective basic ignition angle associated with knock-free operation and a cylinder-selective knock adjustment angle that increases stepwise with a predetermined step size in the retarded direction each time a knock occurs and decreases stepwise with a predetermined step size in the advanced direction after each engine cycle during knock-free operation form a cylinder-selective ignition angle in association with the respective operating point, which is dependent on load and engine speed. A method of that kind is known from German published patent application DE 29 25 770 A1.

When engine knock occurs in a cylinder z of the internal combustion engine, the ignition angle for this cylinder is retarded by a certain amount—step size $SK_{dec}$—thereby reducing the probability that knocking combustion will occur in this cylinder. If the engine then operates without knock, the ignition angle is slowly advanced again by a predetermined amount $SK_{inc}$.

The known total ignition angle $ZW(z)$ for a cylinder z at a particular operating point is made up of a basic ignition angle $GZ(z)$ for knock-free operation, which is dependent on the load L and the engine speed n, is stored in a map and—in the case of a four-cylinder engine—is updated every 180° of crank angle (hence the term "cylinder-selective"), this basic angle being calculated from the ignition dead center position $ZOT(z)$ closest to ignition, and of an additional knock adjustment angle $KNK(z)$ for this cylinder z owing to engine knock: $ZW(z)=GZ(z)-KNK(z)$. It should be noted here that the knock adjustment angle $KNK(z)$ can assume only negative values, in line with the recognition that a positive sign signifies "advance", while a negative sign signifies "retardation".

The respective knock adjustment angles $KNK(z)$ are entered in one load- and engine-speed-dependent map per cylinder. As the change from one operating point to the next occurs, the last knock adjustment angle $KNK(z)$ entered is stored at the old operating point. When the engine re-enters this operating point, this value is reused as the knock adjustment angle $KNK(z)$ for knock control. This method has the disadvantage that a relatively random knock adjustment angle will be stored, depending on the time at which the change in the operating point occurs.

This results in the following disadvantages:
the knock limit is not adapted accurately;
the ignition-angle profile in the case of transitions between the adaptation ranges is nonuniform, and the torque profile is therefore not continuous either;
the internal combustion engine is not operated exactly at the knock limit; as a result, optimum torque and optimum specific fuel consumption are not assured.

SUMMARY OF THE INVENTION

The object of the invention is to provide a method for cylinder-selective knock control of an internal combustion engine which overcomes the above-noted deficiencies and disadvantages of the prior art devices and methods of this kind, and which is improved such that the knock limit is adapted as accurately as possible, that a uniform ignition-angle profile and hence also a continuous torque profile is obtained in the case of transitions between the adaptation ranges, and that optimum torque and optimum specific fuel consumption are established.

With the above and other objects in view there is provided, in accordance with the invention, a cylinder-selective knock control method for an internal combustion engine, in which there is formed, in association with a respective operating point that depends on a load and an engine speed, a cylinder-selective ignition angle from a predetermined cylinder-selective basic ignition angle associated with knock-free operation and a cylinder-selective knock adjustment angle that increases stepwise with a predetermined step size in a retarded direction each time a knock occurs and decreases stepwise with a predetermined step size in an advanced direction after each engine cycle during knock-free operation. The novel method is characterized by the following method steps:

determining a cylinder-selective first adaptation value of a first adaptation circuit from a comparison of the knock adjustment angle with a first and a second threshold value;

wherein the first threshold value is greater than the step size, specified in the retarded direction, of the cylinder-selective knock adjustment angle, and the second threshold value is less than the step size, specified in the retarded direction, of the cylinder-selective knock adjustment angle;

modifying the cylinder-selective adaptation value of the first adaptation circuit in the retarded direction with a predetermined first adaptation step size after each engine cycle for as long as the knock adjustment angle is greater in terms of an absolute value thereof than the first threshold value;

holding the cylinder-selective adaptation value of the first adaptation circuit constant for as long as the knock adjustment angle is less than the first threshold value and greater than the second threshold value in terms of the absolute value; and modifying the cylinder-selective adaptation value of the first adaptation circuit in the advanced direction with a predetermined second adaptation step size for as long as the knock adjustment angle is less in terms of the absolute value than the second threshold value;

determining a second adaptation value, associated with all the cylinders, of a second adaptation circuit from a comparison of the average value of all the cylinder-selective adaptation values of the current operating point with a predetermined threshold; and using the cylinder-selective first adaptation value and the second adaptation value associated with all the cylinders to form a cylinder-selective total ignition angle in accordance with the formula $$ZW(z)=GZ(z)-KNK(z)-AD1(z)-AD2$$

where z is a number of the cylinder, ZW is the total ignition angle, GZ is the basic ignition angle, KNK is the knock adjustment angle, AD1 is the first adaptation value, and AD2 is the second adaptation value.

In accordance with an added feature of the invention, the second adaptation value of the second adaptation circuit:

is modified in the retarded direction by a predetermined decrement after each engine cycle if the average value of all the cylinder-selective adaptation values of the current operating point has a negative sign and is greater in terms of its absolute value than the threshold; and is modified in the advanced direction by a predetermined increment after each engine cycle if the average value is less in terms of its absolute value than the threshold.

In accordance with an additional feature of the invention, at least one quantity of the group consisting of the first step size, the second step size, the first adaptation step size, the second adaptation step size, the first threshold value, and the second threshold value, is stored in dependence on the operating point in a map assigned to the quantity.

In accordance with another feature of the invention, an adaptation of the first or second adaptation circuit is blocked for predetermined operating point ranges.

In accordance with a further feature of the invention, there are specified maximum values in the advanced direction or minimum values in the retarded direction for the adaptation values; the values are thereby applicable to all the cylinders.

In accordance with a concomitant feature of the invention, the sum of the knock adjustment angle and the first adaptation value is incremented with the step size if operation is knockfree in a range in which the knock adjustment angle is greater than the first threshold value.

In sum, the invention adds to the known cylinder-selective knock adjustment angle KNK(z) a first adaptation value AD1 of a first adaptation circuit and a second adaptation value AD2 of a second adaptation circuit common to all the cylinders. The generation of the adaptation values will become clear from the explanation in greater detail below with reference to the schematic drawing figure.

Although the invention is illustrated and described herein as embodied in a method for cylinder-selective knock control of an internal combustion engine, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing figure.

BRIEF DESCRIPTION OF THE DRAWING

FIG. 1 is a graphical timing chart showing the setting of a cylinder-selective ignition angle along a time line.

DESCRIPTION OF THE PREFERRED EMBODIMENTS

Referring now to the schematic figure of the drawing in detail, the total ignition angle ZW(z) for a cylinder z is made up as follows in accordance with the formula below:

$$ZW(z)=GZ(z)-KNK(z)-AD1(z)-AD2.$$

The signs of these values are significant: GZ(z), AD1(z) and AD2 can have positive or negative signs (signifying advance or retardation), while KNK(z) can have only a negative sign (retardation).

The drawing shows the basic ignition angle GZ(z) in relation to the ignition dead center position ZOT(z), the variation of the cylinder-selective knock adjustment angle KNK(z) in relation to the basic ignition angle GZ(z), and the variation of the first and second adaptation values AD1 and AD2 plotted for a particular operating point of the internal combustion engine, which is dependent on the load L and the engine speed n.

The basic ignition angles GZ(z), which are also represented as arrows in the drawing, are entered in a map for each cylinder z as degrees of crank angle ° KW for example, calculated from the ignition top dead center position ZOT (z)=0° KW of the cylinder z (plotted as a horizontal broken line right at the bottom of the drawing)—with a positive sign to indicate advance and a negative sign to indicate retardation—as a function at least of the engine speed n and the load L and, as mentioned above, they are read out from this map and updated.

This basic ignition angle is used for ignition in cylinder z if there is no engine knock: ZW(z)=GW(z).

If engine knock K occurs in cylinder z, however, the total ignition angle ZW(z) is retarded by a knock adjustment angle KNK(z) (decremented), with the step size in each case being $S_{Kdec}$. In the drawing, knocks K are shown after three successive ignitions, shifting the total ignition angle ZW(z) by a value KNK(z)=3*$S_{Kdec}$ in the retarded direction to ZW(z)=GZ(z)−KNK(z)=GZ(z)−3*$S_{Kdec}$.

If, subsequently, engine knock no longer occurs, the absolute value of the knock adjustment angle KNK(z) is reduced by a predetermined step $S_{Kinc}$ after each engine cycle (720° of crank angle) or after several engine cycles (or at predetermined time intervals), as illustrated in enlarged form within a broken-lined circle in the drawing, and the total ignition angle ZW(z) is hence also advanced again (incremented).

The step sizes $S_{Kdec}$ and/or $S_{Kinc}$ can be constants or vary as a function of the operating point.

In the drawing, two predetermined threshold values, a first threshold value DEC and a second threshold value INC, which are retarded relative to the basic ignition angle GZ(z), have been entered as chain-dotted lines, these values being significant for the first adaptation value AD1(z) of the first adaptation circuit:

as long as the knock adjustment angle KNK(z) is greater in terms of its absolute value than the first threshold value DEC, t2 to t3 in the drawing, a cylinder-selective first adaptation value AD1(z) should be increased with a predetermined step size $S_{ADdec}$, (thereby retarding, i.e. decrementing, the total ignition angle ZW(z));

as long as the knock adjustment angle KNK(z) is less in terms of its absolute value than the first threshold value DEC and greater in terms of its absolute value than the second threshold value INC, t3 to t4 in the drawing, the cylinder-selective first adaptation value AD1(z) should be constant; and as soon as the knock adjustment angle KNK(Z) is less in terms of its absolute value than the second threshold value INC, from t4 in the drawing, the absolute value of the cylinder-selective first adaptation value AD1(z) should be reduced with a predetermined step size $S_{ADinc}$.

In a preferred exemplary embodiment, the sum of the knock adjustment angle KNK(z) and the first adaptation value AD1 (broken line between t2 and t3 in the drawing) should be incremented with the step size $S_{kinc}$ for as long as the knock adjustment angle KNK(z) is greater in terms of its absolute value than the first threshold value DEC, in order to avoid slowing the rate at which the total ignition angle ZW(z) is incremented.

The step size $S_{Kdec}$ is chosen so that, as illustrated in the drawing, the predetermined first threshold value DEC is not exceeded by the knock adjustment angle KNK(z) at the very first knock but, for example, only at the second knock at time t1, e.g. $S_{Kdec}$=3° of crank angle and DEC=3.5° of crank angle. This has a damping effect on the knock control system. The first adaptation values AD1(z), which are stored in a map as a function of the operating point for each cylinder, and second adaptation values AD2, described below, are illustrated in separate diagrams in the drawing, the upper diagram representing the sum of GZ(z)−KNK(z)−AD1(z) as a broken line.

In the first adaptation circuit, cylinder-selective knock adaptation is performed to adapt the ignition angle differences as a function of the load L and the engine speed n on the basis of the differences in compression between the cylinders. The map in which the first adaptation values AD1(z) are stored contains the cylinder-specific adaptation components used for knock control, these having been determined at the respective operating point.

The knock limits are generally adjusted for a defined engine and a defined fuel. In normal operation, engines, components and fuels have certain tolerances, which can have a considerable effect on the knock limit. These deviations apply to all the cylinders; with the exception of the fuel grade, they generally change only slowly.

To compensate effectively for such effects, a second adaptation value AD2 of a second adaptation circuit common to all the cylinders is formed by calculating the average value $\overline{AD1}$ of the first adaptation values AD1(z) of the first adaptation circuit of all the cylinders at the respective operating point and comparing it with a predetermined threshold S2. If the average value $\overline{AD1}$ is greater in terms of its absolute value than S2, AD2 is retarded by a predetermined decrement D (with a negative sign) after each engine cycle; otherwise, it is advanced by a predetermined increment I (with a positive sign). In the case of a change of operating point, the average value $\overline{AD1}$ is calculated from the first adaptation values AD1(z) of the new operating point and compared with the threshold S2, and AD2 is increased or reduced in accordance with the result of comparison.

In the drawing, the bold continuous line ZW(z) shows the variation of the total ignition angle ZW(z) for a cylinder (z), comprising the basic ignition angle GZ(z), the knock adjustment angle KNK(z), the first adaptation value AD1(z) and the second adaptation value AD2, which is common to all the cylinders:

$$ZW(z)=GZ(z)-KNK(z)-AD1(z)-AD2,$$

where the values KNK(z), AD1(z) and AD2 each bring about a retardation of the ignition angle.

The instantaneously valid quantities for ZW(z), KNK(z), AD1(z) and AD2 are represented as arrows.

Normally, the total ignition angle ZW(z) is not advanced beyond the predetermined basic ignition angle GZ(z). When changing to a fuel with a higher octane rating, for example, it may however be appropriate to take account of this fact and to permit positive values for the first and second adaptation circuit, which can mean the total ignition angle being advanced beyond the basic ignition angle GZ(z). It is therefore worthwhile to specify valid maximum values (+$AD1_{max}$, +$AD2_{max}$) in the advanced direction or even minimum values −$AD1_{min}$, −$AD2_{min}$) in the retarded direction for the adaptation values (AD1(z)) or (AD2) for all the cylinders (z).

In this case, however, it is necessary for physical reasons to determine operating point ranges in which such an advance beyond the basic ignition angle GZ(z) should be permitted and to define limiting values (if necessary dependent on the operating point) for such an advance in order to avoid engine damage.

After each engine cycle (every 720° of crank angle), the instantaneous values KNK(z) and AD1(z) are stored in the corresponding maps as a function of the operating point, the common second adaptation value AD2 also being stored, and the operating point is re-determined as a function of the load L and the engine speed n.

When the internal combustion engine is switched off, all the first adaptation values AD1(z) of the first adaptation circuit are stored in cylinder-selective maps, and the second adaptation value AD2 of the second adaptation circuit is stored in non-volatile memory (in an EEPROM) and read back when operation starts again.

Because the adaptation rates (step sizes $S_{ADdec}$, $S_{ADinc}$) for decrementing and implementing the adaptation values AD1 of the first adaptation circuit are separate, the average position of the ignition angle at the knock limit can be determined quite accurately.

Defining ranges of the knock adjustment angle KNK(z) in which no adaptation is performed (by means of the threshold values DEC and INC) ensures that minor knock control activity does not-trigger changes to the adaptation values; this calms the first adaptation circuit and leads to uniform ignition angles.

The knock control component is made up of the knock adjustment angle KNK(z) and the two adaptation values AD1(z) and AD2. The characteristic of each individual circuit can advantageously be adjusted independently of those of the other circuits. This makes it possible to adapt the knock control system in an optimum manner to each internal combustion engine.

Owing to the fact that the threshold values DEC and INC for the activation of the first adaptation circuit are linked with the step sizes $S_{Kdec}$, $S_{Kinc}$ of the knock adjustment angles KNK(z), the adaptation characteristic is not affected if the knock control parameters are changed.

The input variables for the second adaptation circuit are the first adaptation values AD1(z) of the first adaptation circuit, thereby allowing the damping effect of the latter to be exploited; the only ignition angle corrections that occur in the second adaptation circuit are those caused by the effects of aging or by changes in the fuel grade.

We claim:

1. A cylinder-selective knock control method for an internal combustion engine, which comprises:
   defining, in association with a respective operating point that depends on a load and an engine speed, a cylinder-selective ignition angle from a predetermined cylinder-selective basic ignition angle associated with knock-free operation and a cylinder-selective knock adjustment angle that increases stepwise with a predetermined step size in a retarded direction each time a knock occurs and decreases stepwise with a predetermined step size in an advanced direction after each engine cycle during knock-free operation;
   determining a cylinder-selective first adaptation value of a first adaptation circuit from a comparison of the knock adjustment angle with a first and a second threshold value;
   wherein the first threshold value is greater than the step size, specified in the retarded direction, of the cylinder-selective knock adjustment angle, and the second threshold value is less than the step size, specified in the retarded direction, of the cylinder-selective knock adjustment angle;

modifying the cylinder-selective adaptation value of the first adaptation circuit in the retarded direction with a predetermined first adaptation step size after each engine cycle for as long as the knock adjustment angle is greater in terms of an absolute value thereof than the first threshold value;

holding the cylinder-selective adaptation value of the first adaptation circuit constant for as long as the knock adjustment angle is less than the first threshold value and greater than the second threshold value in terms of the absolute value; and modifying the cylinder-selective adaptation value of the first adaptation circuit in the advanced direction with a predetermined second adaptation step size for as long as the knock adjustment angle is less in terms of the absolute value than the second threshold value;

determining a second adaptation value, associated with all the cylinders, of a second adaptation circuit from a comparison of the average value of all the cylinder-selective adaptation values of the current operating point with a predetermined threshold; and using the cylinder-selective first adaptation value and the second adaptation value associated with all the cylinders to form a cylinder-selective total ignition angle in accordance with the formula $$ZW(z)=GZ(z)-KNK(z)-AD1(z)-AD2$$

where z is a number of the cylinder, ZW is the total ignition angle, GZ is the basic ignition angle, KNK is the knock adjustment angle, AD1 is the first adaptation value, and AD2 is the second adaptation value.

2. The method according to claim 1, which comprises:

modifying the second adaptation value of the second adaptation circuit in the retarded direction by a predetermined decrement after each engine cycle if the average value of all the cylinder-selective adaptation values of the current operating point has a negative sign and is greater in terms of its absolute value than the threshold; and modifying the second adaptation value of the second adaptation circuit in the advanced direction by a predetermined increment after each engine cycle if the average value is less in terms of its absolute value than the threshold.

3. The method according to claim 1, which comprises storing at least one quantity selected from the group consisting of the first step size, the second step size, the first adaptation step size, the second adaptation step size, the first threshold value, and the second threshold value, as a function of the operating point in a map assigned to the quantity.

4. The method according to claim 1, which comprises blocking an adaptation of the first or second adaptation circuit for predetermined operating point ranges.

5. The method according to claim 1, which comprises specifying maximum values in the advanced direction or minimum values in the retarded direction, the values being applicable to all the cylinders, for the adaptation values.

6. The method according to claim 1, which comprises incrementing a sum of the knock adjustment angle and the first adaptation value with the step size if operation is knock-free in a range in which the knock adjustment angle is greater than the first threshold value.

* * * * *